United States Patent [19]

Dreisbach et al.

[11] Patent Number: 6,068,996
[45] Date of Patent: May 30, 2000

[54] METHOD OF PRODUCING OPTICALLY ACTIVE AMINES

[75] Inventors: Claus Dreisbach, Köln; Uwe Stelzer, Burscheid, both of Germany

[73] Assignee: Bayer AG, Leverkusen, Germany

[21] Appl. No.: 09/123,763

[22] PCT Filed: Jan. 20, 1997

[86] PCT No.: PCT/EP97/00239

§ 371 Date: Jul. 28, 1998

§ 102(e) Date: Jul. 28, 1998

[87] PCT Pub. No.: WO97/28271

PCT Pub. Date: Aug. 7, 1997

[30] Foreign Application Priority Data

Feb. 1, 1996 [DE] Germany .................. 196 03 575

[51] Int. Cl.[7] .................................................. C12P 13/00
[52] U.S. Cl. .................................. 435/128; 435/280
[58] Field of Search ........................... 435/128, 280

[56] References Cited

U.S. PATENT DOCUMENTS 5,728,876   3/1998   Balkenhohl et al. .

FOREIGN PATENT DOCUMENTS

4332738 A1   3/1995   Germany .

OTHER PUBLICATIONS

"Benzene, Its Derivatives, & Condensed Benzenoid Compds." *Chemical Abstracts* (1996) vol. 125, No. 19, p. 1097, published in US.

Gotor, V et al. "Synthesis of Optically Active Amides from β–Furyl and β–Phenyl Esters by way of Enzymatic Aminolysis" *J. Chem. Soc. Perkin Trans.* (1993) pp. 2453–2456, published in US.

Reetz, MT and C Dresibach. "Highly Efficient Lipase Catalyzed Kinetic Resolution of Chiral Amines" *Chimia* (Dec. 1994), vol. 48, No. 12, p. 570, published in US.

*Primary Examiner*—Herbert J. Lilling
*Attorney, Agent, or Firm*—Brinks Hofer Gilson & Lione

[57] ABSTRACT

20 Claims, No Drawings

METHOD OF PRODUCING OPTICALLY ACTIVE AMINES

BACKGROUND OF THE INVENTION

The present invention relates to a novel process for the preparation of known, optically active amines which can be used as intermediates for the preparation of pharmaceuticals and crop protection agents.

It has already been disclosed in DE-A 4 332 738 that optically active primary and secondary amines can be prepared by first subjecting a racemic amine with an ester having an electron-rich hetero atom in the acid moiety in the vicinity of the carbonyl carbon to enantioselective acylation in the presence of a hydrolase, then resolving the resulting mixture of optically active (S)-amine and optically active acylated (R)-amine (=amide), thus obtaining the (S)-amine, and, if appropriate, obtaining the other enantiomer from the acylated (R)-amine by means of amide cleavage. Suitable hydrolases are lipases from Pseudomonas, for example Amano P, or from Pseudomonas spec. DSM 8246. The degree of optical purity of the enantiomers obtained is very high. However, the disadvantage of this process is that fairly long reaction times are required when carrying out the enzymatic acylation, and that the process is carried out in highly dilute solution. The remaining (S)-enantiomer is obtained in sufficiently high optical yield only after relatively long reaction times. Thus, the space-time yields which can be achieved leave something to be desired for practical purposes. Also disadvantageous is the fact that relatively high amounts of enzyme are required relative to the substrate. Besides this, the activity of the enzyme is very high so that purification, concentration and working-up require great considerable resources. Moreover, this procedure is only suitable for a batchwise procedure.

Furthermore it can be seen from Chimia 48, 570 (1994) that a few racemic amines react enantioselectively with ethyl acetate in the presence of lipase from Candida antarctica to give mixtures of (S)-amine and acetylated (R)-amine (=amide), from both of which (S)-amine and acetylated (R)-amine can be isolated, it being possible for the acetylated (R)-amine to be liberated by subsequent amide cleavage. The disadvantage of this method is that, again, the reaction times are quite long and that, moreover, the yields are not always satisfactory. Moreover, the enzyme-substrate ratio is again disadvantageous so that economical exploitation of the process, in particular also a batchwise procedure, are hardly possible.

SUMMARY OF THE INVENTION

It has now been found that optically active (S)-amines of the formula

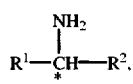

(I-S)

in which
R$^1$ and R$^2$ are different,
R$^1$ is methyl, ethyl or a radical of the formula (II)

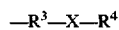

(II)

where
R$^3$ represents a $C_1$–$C_{10}$-alkylene radical or a $C_2$–$C_{10}$-alkenylene radical, R$^4$ represents a $C_1$–$C_{10}$-alkyl radical, a $C_6$–$C_{10}$-aryl radical or a $C_7$–$C_{14}$-aralkyl radical and
X represents O, S or NR$^5$ (where R$^5$=$C_1$–$C_{10}$-alkyl or phenyl) and
R$^2$ represents $C_1$–$C_{10}$-alkyl or optionally substituted $C_6$–$C_{14}$-aryl are obtained when,
a) in a first step, racemic amines of the formula

(I)

in which
R$^1$ and R$^2$ have the abovementioned meanings are reacted with esters of the formula

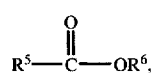

(III)

in which
R$^5$ and R$^6$ are identical or different and in each case represent optionally substituted $C_1$–$C_{20}$-alkyl or optionally substituted $C_6$–$C_{10}$-aryl and R$^5$ can additionally also denote hydrogen in the presence of Candida antarctica lipase and, if appropriate, in the presence of a diluent, and,
b) in a second step, the resulting mixture comprising (S)-amine of the formula (I-S), and acylated (R)-amine of the formula

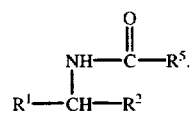

(IV-R)

in which
R$^1$, R$^2$ and R$^5$ have the abovementioned meanings is resolved.

DESCRIPTION OF THE INVENTION (R)-Amines are to be understoood as meaning those optically active compounds of the formula (I) and (IV-R) which have the (R)-configuration at the asymmetrically substituted carbon atom. Similarly (S)-amines are to be understood as meaning those optically active compounds of the formula (I) and (I-S) which have the (S)-configuration in the chiral centre. In the formulae for (R)- and (S)-amines, the asymmetrically substituted carbon is marked in each case by an *.

Suitable substituents for alkyl and aryl radicals are, for example, up to 3 identical or different substituents from the group consisting of $C_1$–$C_6$-alkyl, $C_1$–$C_6$-alkoxy, halogen, nitro and cyano radicals. The alkyl radicals which are substituted by alkyl radicals are branched alkyl radicals.

In formulae (I), (I-S) and (IV-R), R$^1$ and R$^2$ differ from each other,
R$^1$ preferably representing methyl, ethyl or a radical of the formula (III) where R$^3$ represents a methylene or ethylene radical, R$^4$ represents a methyl, ethyl, phenyl or benzyl radical and X represents O, and
R$^2$ preferably representing $C_1$–$C_4$-alkyl.

In formulae (I), (I-S) and (IV-R), R$^1$ very especially preferably represents —CH$_2$—O—CH$_3$ and R$^2$ methyl.

In formulae (III) and (IV-R), $R^5$ preferably represents $C_1$–$C_6$-alkyl which is optionally mono- or disubstituted by $C_1$–$C_4$-alkyl or represents phenyl which is optionally mono- or disubstituted by $C_1$–$C_4$-alkyl, $C_1$–$C_4$-alkoxy, chlorine, bromine, nitro and/or by cyano. $R^5$ especially preferably represents unsubstituted $C_1$–$C_4$-alkyl. In formula (III), $R^6$ independently of $R^5$ preferably and especially preferably represents one of the radicals which are mentioned under $R^5$ as being preferred and especially preferred. $R^5$ very especially preferably represents methyl and $R^6$ ethyl.

It must be considered as extremely surprising that optically active amines of the formula (I-S) can be prepared by the process according to the invention in high yield and very good optical purity. This is because it could not have been anticipated from the known prior art that the specific use of Candida antarctica lipase causes high enantioselectivity and a higher reaction rate when reacting the particular amine and the particular ester than the enzyme systems previously used in similar processes.

The process according to the invention has a series of advantages. Thus, the process allows a large number of optically active amines to be prepared in high yield and outstanding optical purity. Also advantageous is the fact that the process can be carried out at a relatively high substance concentration, the reaction times are short and a continuous procedure is possible. Another advantage is the fact that the biocatalyst required is available in larger amounts and is also stable at elevated temperature. In relation to the substrate, relatively low amounts of biocatalyst can be employed. Finally, the reaction can be performed and the desired substances isolated without difficulties.

The racemic amines of the formula (I) which are required as starting materials for the process according to the invention are known or can be prepared by methods known per se. Equally, the esters of the formula (III) required are known or can be prepared by methods known per se. The lipase required can be employed either in native or in immobilized form. Possible immobilizations are, for example, the use of the lipase in microencapsulated form or bound to an organic or inorganic support material. Examples of suitable support materials are kieselguhr, ion exchangers, zeolites, polysaccharides, polyamides and polystyrene resins, in particular Celite® and Lewatit® types. An example of a suitable lipase is Candida antarctica lipase in the form of the commercially available product Novozym® 435.

Suitable diluents optionally to be employed are a wide range of organic solvents, in particular ethers such as, for example, diethyl ether or methyl tert-butyl ether (=MTBE). It is also possible to carry out the process without adding a particular diluent. It is expedient to employ an excess of the ester of the formula (III).

For example, 0.5 to 20 mol of an ester of the formula (III) can be employed per mol of racemic amine of the formula (I). When carrying out the procedure without additional diluent, this amount of ester is preferably 1 to 10 mol, in particular 1 to 5 mol. When carrying out the procedure with addition of a diluent, this amount of ester is preferably 1 to 7 mol, in particular 1 to 4 mol.

The process according to the invention can be carried out for example at temperatures in the range of 0 to 90° C., in particular 10 to 60° C. The process is usually carried out under atmospheric pressure, if appropriate under an inert gas, for example nitrogen.

When carrying out the process according to the invention batchwise, this may be done for example in such a way that the particular racemic amine of the formula (I), the particular ester of the formula (III), if appropriate a diluent and Candida antarctica lipase are combined in any desired sequence and the mixture formed is stirred at the particular reaction temperature until the desired conversion has been achieved. The amount of lipase based on the racemic amine of the formula (I) can be varied within wide limits. For example, 0.1 to 40% by weight of immobilized lipase, for example Novozym® 435, based on the racemic amine of the formula (I), can be employed, or else a corresponding amount of native lipase. This amount is preferably 0.5 to 30% by weight of immobilized lipase or the corresponding amount of native lipase.

When carrying out the process according to the invention continuously, this may be done for example in such a way that a mixture comprising a racemic amine of the formula (I), an ester of the formula (III) and, if appropriate, a diluent is passed over immobilized Candida antarctica lipase at reaction temperature. Here, relative to the racemic amine of the formula (I), the lipase may be employed for example in such an amount as is required for obtaining a particular desired conversion of the racemic amine of the formula (I). The desired conversion of the racemic amine of the formula (I) depends on the intended enantiomeric excess in the resulting (S)-amine of the formula (I-S) or the intended enantiomeric excess in the resulting acylated (R)-amine obtained, of the formula (IV-R). For example, at least 0.000001 g of immobilized lipase, for example Novozym® 435, or a corresponding amount of native lipase may be employed per g of racemic amine of the formula (I). This amount is preferably 0.000001 to 0.1 g of immobilized lipase or a corresponding amount of native lipase.

When working up the mixture which is present after reacting the racemic amine of the formula (I) with the ester of the formula (III), it is, in the case of a batchwise procedure, first necessary to separate off the lipase, which can be effected for example by filtration. Lipase which has thus been separated off can be reused in the next batch. The lipase may be repeatedly recirculated in such a way. The mixture present after the lipase has been separated off corresponds to the mixture obtained when carrying out the procedure continuously. It contains the acylated (R)-amine of the formula (IV-R), which has been obtained from the R form of the racemic amine of the formula (I), the desired (S)-amine of the formula (I-S), the alcohol formed from the ester employed, if appropriate unreacted (R)-amine of the formula (I), if appropriate unreacted ester of the formula (III), and if appropriate diluent.

The desired (S)-amine of the formula (I-S) can be separated off for example by means of distillation or extraction. Distillation is preferred.

The residue which remains after this separation step can be discarded or used as desired. For example, the acylated (R)-amine of the formula (IV) which it contains can be isolated, for example by distillation, and obtained as such, or, after the acylated (R)-amine of the formula (IV) has been isolated, the acyl group can be eliminated in a manner known per se and the (R)-amine which corresponds to the prepared (S)-amine of the formula (I-S) can be obtained, or the acylated (R)-amine which the residue contains can be subjected to racemization and, after the acyl group has been removed, reused in the process according to the invention.

The amines of the formula (I-S) which can be prepared by the process according to the invention are valuable intermediates for the preparation of pharmaceuticals or of active compounds having insecticidal, fungicidal or herbicidal properties. They are particularly suitable for the preparation of herbicidally active N-thienylchloro-acetamides (see, for example, EP-A 296 463 and EP-A 210 320).

EXAMPLES

Example 1

1 g of immobilized Candida antarctica lipase (Novozym® 435) was suspended in 50 ml of MTBE, the suspension was treated with 10 g of (±)-2-amino-1-methoxy-propane, and 38.8 g of ethyl acetate were added. After the mixture had been stirred for 22 hours at 30° C., the reaction was quenched. At a yield of 40%, the ee value for (S)-2-amino-1-methoxypropane was over 96% (GC).

Example 2

In a glass tube (length 22 cm, internal diameter 1 cm) whose bottom was covered by a frit and was heated at 40° C., 3.77 g of immobilized Candida antarctica lipase (Novozym® 435) were introduced in the form of a suspension in MTBE. The bed volume amounted to 17 ml. Then, a solution of 10 g of (±)-2-amino-1-methoxy-propane in 100 ml of MTBE and 38.8 g of ethyl acetate was pumped in via the frit at a rate of 10 ml/h. A constant conversion of 60%, based on racemate, was established. The ee value for (S)-2-amino-1-methoxypropane was over 97% (GC).

Example 3

The immobilized Candida antarctica lipase was separated off from the reaction mixture obtained in accordance with Example 1 by means of filtration and the filtrate was worked up by distillation. Ethyl acetate, ethanol and MTBE first distilled over under atmospheric pressure, then, at 99° C., (S)-2-amino-1-methoxypropane, and, finally, at 13 mbar and 105 to 110° C., (R)-N-acetyl-2-amino-1-methoxypropane.

Example 4

The process was as in Example 1, but the lipase which had been recovered in accordance with Example 3 was employed instead of fresh immobilized antarctica lipase. Yield and ee value for (S)-2-amino-1-methoxypropane were as in Example 1.

Example 5

3 g of immobilized Candida antarctica lipase (Novozym® 435) were suspended in 100 ml of MTBE, and the suspension was treated with 10 g of (±)-2-amino-1-benzyloxypropane and 20.8 g of ethyl acetate. The mixture was stirred at 40° C. and interrupted after a conversion of 50%. The reaction solution was filtered and distilled over a column. This gave 3.5 g of (S)-2-amino-1-benzyloxypropane (b.p. =73° C. at 1.8 mbar) of ee 95%.

Example 6

3 g of immobilized Candida antarctica lipase (Novozym® 435) were suspended in 100 ml of MTBE, and the suspension was treated with 10 g of (±)-2-amino-1-benzyloxybutane, and 19.3 g of ethyl acetate. The mixture was stirred at 40° C. and interrupted after a conversion of 50%. The reaction solution was filtered and distilled over a column. This gave 3.5 g of (S)-2-amino-1-benzyloxypropane (b.p. =111° C.–113° C. at 7.6 mbar) of ee 95%.

What is claimed is:

1. A process for the preparation of optically active (S)-amines of the formula

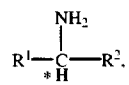

(I-S)

in which
$R^1$ is of the formula (II)

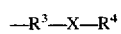

(II)

where
$R^3$ represents a $C_{10}$–$C_{10}$-alkylene radical,
$R^4$ represents a $C_1$–$C_{10}$-alkyl radical or a $C_7$–$C_{14}$-aralkyl radical and
X represents O and
$R^2$ represents $C_1$–$C_{10}$-alkyl, which comprises,
a) reacting in a first step, racemic amines of the formula

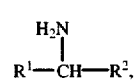

(I)

in which
$R^1$ and $R^2$ have the abovementioned meanings with esters of the formula

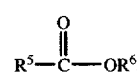

(II)

in which
$R^5$ and $R^6$ are identical or different and in each case represent unsubstituted, mono-$C_1$–$C_4$-alkyl-substituted or di-$C_1$–$C_4$-alkyl-substituted $C_1$–$C_6$-alkyl in the presence of Candida antarctica lipase and
b) resolving in a second step, the resulting mixture comprising (S)-amine of the formula (I-S), and acylated (R)-amine of the formula

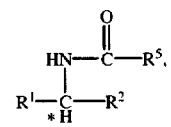

(IV)

in which $R^1$, $R^2$ and $R^5$ have the abovementioned meanings.

2. The process of claim 1, in which formulae (I), (I-S), $R^1$ and $R^2$ differ from each other and $R^1$ is of the formula (III) where $R^3$ represents a methylene or ethylene radical, $R^4$ represents a methyl, ethyl or phenyl radical, X represents O and $R^2$ represents $C_1$–$C_4$ alkyl.

3. The process of claim 1, wherein the reaction is conducted continuously and at least 0.000001 g of Candida antarctica lipase is used per g of racemic amine of the formula (I).

4. The process of claim 1, in which in the formulae, $R^1$ represents —$CH_2$—O—$CH_3$, $R^2$ represents methyl and $R^5$ and $R^6$ independently of one another represent unsubstituted $C_1$–$C_4$-alkyl.

5. The process of claim 1, which is carried out in the presence of an organic solvent.

6. The process of claim 1, in which step a) is carried out in the presence of a diluent.

7. The process of claim 1, in which 0.5 to 20 mol of ester of the formula (III) are employed per mol of racemic amine of the formula (I).

8. The process of claim 1, which it is carried out at 0 to 90° C.

9. The process of claim 1, wherein the reaction is conducted continuously and 0.000001 to 0.1 g of Candida antarctica lipase is used per g of racemic amine of the formula (I).

10. The process of claim 1, in which the (S)-amine prepared is separated off by means of distillation.

11. The process of claim 1, in which after the (S)-amine prepared has been separated off, the acylated (R)-amine which has also been obtained is isolated.

12. The process of claim 1, in which after the (S)-amine prepared has been separated off, the acylated (R)-amine which has also been obtained is isolated and the (R)-amine which corresponds to the (S)-amine prepared is obtained from the acylated (R)-amine by eliminating the acyl group.

13. The process of claim 6, wherein said organic solvent is diethyl ether or methyl t-butyl ether.

14. The process of claim 7, in which 1 to 10 mol of ester of the formula (III) is present per mol of racemic amine of the formula (I).

15. The process of claim 1, in which diluent is present and in which 1 to 7 mol of ester of the formula (III) is present per mol of racemic amine of the formula (I).

16. The process of claim 15, in which diluent is present and in which 1 to 4 mol of ester of the formula (III) is present per mol of racemic amine of the formula (I).

17. The process of claim 8, which is carried out at 0 to 60° C.

18. The process of claim 1, wherein the reaction is conducted batchwise and 0.1 to 40% of immobilized Candida antarctica lipase, based on the total amount of amine, is used.

19. The process of claim 18, wherein the reaction is conducted batchwise and 0.5 to 30% of immobilized Candida antarctica lipase, based on the total amount of amine, is used.

20. A process for the preparation of optically active (S)-amines of the formula

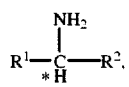
(I-S)

in which
R¹ represents -CH₂—O—CH₃,
R² represents methyl,
which comprises,
a) reacting in a first step, racemic amines of the formula

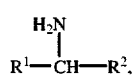
(I)

in which
R¹ and R² have the abovementioned meanings with esters of the formula

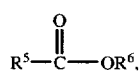
(II)

in which
R⁵ and R⁶ independently of one another represent unsubstituted C₁–C₄-alkyl in the presence of Candida antarctica lipase and b) resolving in a second step, the resulting mixture comprising (S)-amine of the formula (I-S), and acylated (R)-amine of the formula

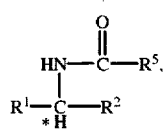
(IV)

in which R¹, R² and R⁵ have the abovementioned meanings.

* * * * *

UNITED STATES PATENT AND TRADEMARK OFFICE
CERTIFICATE OF CORRECTION

PATENT NO. : 6,068,996
DATED : May 30, 2000
INVENTOR(S) : Claus Dreisbach et al.

It is certified that error appears in the above-identified patent and that said Letters Patent is hereby corrected as shown below:

In claim 1, line 16, delete "$R^3$ represents a $C_{10}-C_{10}$-alkylene" and substitute --$R^3$ represents a $C_1-C_{10}$-alkylene-- in its place.

Signed and Sealed this

Eighth Day of May, 2001

NICHOLAS P. GODICI

Attest:

Attesting Officer

Acting Director of the United States Patent and Trademark Office